Dec. 25, 1962 J. G. ZUBATY 3,069,857
CONSTANT SPEED DRIVE MECHANISM
Filed Nov. 21, 1960

INVENTOR.
Joseph G. Zubaty
BY
R. L. Spencer
ATTORNEY

United States Patent Office 3,069,857
Patented Dec. 25, 1962

3,069,857
CONSTANT SPEED DRIVE MECHANISM
Joseph G. Zubaty, Flint, Mich., assignor to General Motors Corporation, Detroit, Mich., a corporation of Delaware
Filed Nov. 21, 1960, Ser. No. 70,468
10 Claims. (Cl. 60—53)

This invention relates to an accessory drive for driving the accessories of an engine and more particularly to an accessory drive constructed and arranged to provide a substantially constant speed of rotation of the engine driven accessories throughout a wide speed range of the engine.

It is well known that in conventional accessory drive arrangements wherein the accessories are driven directly proportional to engine speed such accessories are often driven at speeds in excess of desirable and useful speeds. This results in excess noise and power consumption and unnecessary wear of the accessories. For example, when operating a vehicle on a highway at normal highway speeds, the cooling requirements of the engine are such that it is desirable to reduce the fan speed relative to engine speed. The same is true of other accessories such as the generator, air suspension pump, power steering pump and air conditioning compressor commonly used on vehicles.

An object of this invention is to provide an accessory drive constructed and arranged to limit the speed range of engine driven accessories throughout a wide range of engine speed.

Another object of this invention is to provide an accessory drive of the type described which is of compact construction and readily adaptable for use on existing vehicles.

A further object of this invention is to provide an accessory drive of the type described incorporating a variable capacity pump and motor driven by the pump all contained in a compact sealed unit and designed to be used in installations wherein the space requirements are critical.

An additional object of this invention is to provide a hydraulic drive for driving engine accessories incorporating a variable capacity pump and a variable capacity motor and incorporating speed responsive means for limiting the speed of rotation of the motor throughout a wide speed range of the pump.

Another object of this invention is to provide an accessory drive unit for driving engine accessories of a vehicle engine incorporating an engine driven pump and a motor driven by the pump wherein the pump and motor are disposed in a housing in concentric relation with respect to each other and wherein a centrifugal element disposed within the housing is effective to automatically vary the speed of rotation of the motor with respect to the speed of rotation of the pump.

A particular object of this invention is to provide an accessory drive unit for driving engine accessories incorporating a variable capacity vane type pump and a variable capacity vane type motor arranged in concentric relation with respect to each other wherein a common guide member is provided for the vanes of the pump and motor and wherein speed responsive mechanism is effective to move the guide member to decrease the speed of rotation of the motor with respect to the speed of rotation of the pump upon an increase in speed of rotation of the pump.

These and other objects and advantages of the invention will be apparent from the following description and claims, taken in conjunction with the following drawings, in which:

Figure 1:
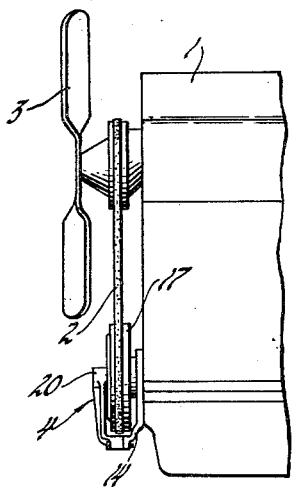
FIGURE 1 is a side elevation illustrating an accessory drive unit mounted on an engine for driving an engine fan.

Referring to FIGURE 1 there is shown an engine 1 for driving a fan 3 through a belt 2 driven by an accessory drive unit 4 incorporating the principles of this invention. While a single fan and belt are shown in FIGURE 1, it will readily be understood that belt 2 may drive additional engine accessories such as a generator and power steering pump. If desirable multiple pulleys and belts may be used to drive additional engine accessories such as, for example, an air compressor or an air conditioning refrigerant compressor, not shown.

Figure 2:
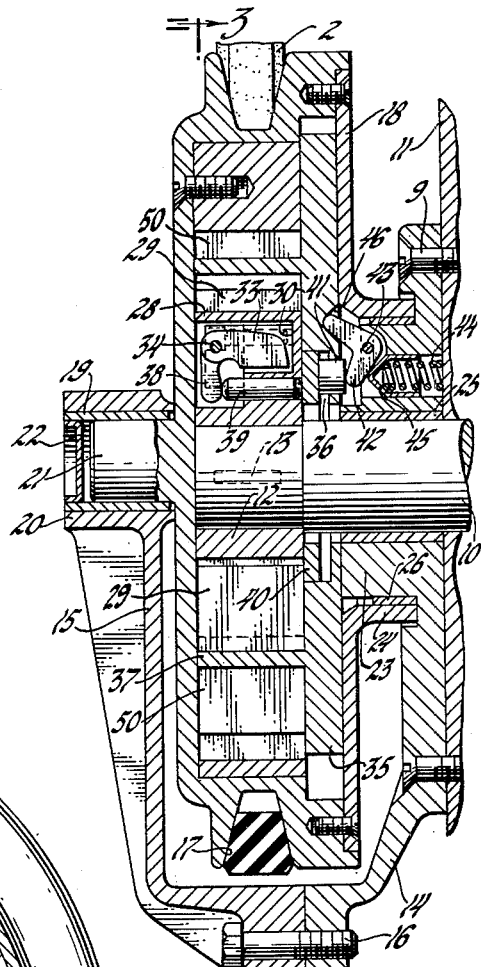
FIGURE 2 is a sectional view through a drive unit constructed in accordance with the principles of this invention.

Referring to FIGURE 2 there is shown a power input shaft 10 extending outwardly from a fixed support 11, the shaft 10 having a hub member 12 fixed thereto for rotation therewith by means of a key 13. Member 11 may be the front end of a vehicle engine and the shaft 10 may be an extension of the engine crankshaft. A support member 14 is detachably secured to engine 11 by screws 9 and a support member 15 is detachably secured to support 14 by screws 16. Power delivery pulley 17 has a detachable pulley cover 18 secured thereto for rotation therewith. A bushing 19 is disposed in a hollow boss 20 on support member 15 to rotatably support an axially extending shaft 21 fixed to pulley 17. An oil seal 22 is disposed in the open end of bushing 19. Support member 14 has an axially extending portion 23 adapted to receive an axially extending boss 24 on pulley cover 18, a bushing 25 support shaft 10 in boss 23 and a bushing 26 supports boss 24 for rotation on boss 23.

Figure 3:
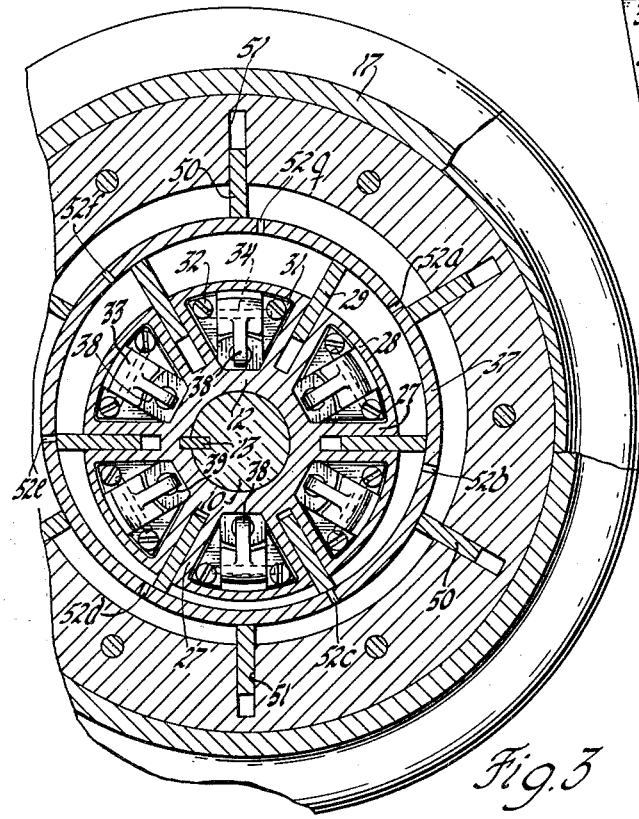
FIGURE 3 is a sectional view taken along the line 3—3 of FIGURE 2.

As best shown in FIGURE 3, hub 12 is provided with six equally spaced radially extending spokes 27 which join a rim 28 to hub 12. Each spoke 27 and the rim 28 are slotted to receive a pump vane 29, each vane extending outwardly beyond the periphery of the rim. A back wall 30, best shown in FIGURE 2, joins the rim 28 to the hub 12 in the space between the adjacent spokes. A mounting bracket 31 is secured to wall 30 by screws 32. A weight 33 is pivotally supported on mounting bracket 31 by means of a pin 34. Six such mounting brackets and weights are provided, each mounting bracket and weight being disposed in the space between adjacent spokes and between rim 28 and hub 12.

Located within pulley 17 between a side wall of pulley 17 and cover 18 and radially movable with respect to pulley 17 is a guide member 35 having an annular axially extending recess 36 and an axially extending annular boss or flange 37. Pump vanes 29 supported in spokes 27 contact the inner surface of boss 37 as best shown in FIGURE 3. Each weight 33 has formed thereon an arm 38 adapted to contact a pin 39 carried by hub 12 and axially movable with respect to the hub. A ring member 40 in recess 36 is disposed adjacent a force transfer plug 41 and is adapted to move plug 41 axially against one arm of a bell crank lever 42 supported upon a pivot pin 43 in housing boss 23. A spring 44 normally biases a plunger 45 into contact with the arm of the bell crank lever acted upon by member 41. The opposite arm of bell crank lever 42 rides in a recess or cavity 46 in guide member 35.

A plurality of motor vanes 50, six in number, are carried in equally spaced slots 51 formed on pulley 17. Motor vanes 50 contact the external surface of boss 37. Boss 37 is provided with seven openings 52a through 52g to permit flow of oil from pump vanes 29 to motor vanes 50 and from motor vanes 50 back to the pump vanes 29.

In operation, rotation of shaft 10 drives hub 12 and pump vanes 29. In FIGURE 2, the boss 37 of guide member 35 is in its position of maximum eccentricity which is the position assumed at rest or at slow speed operation. Spring 44 and plunger 45 cause clockwise rotation of bell crank lever 42 so that the arm of lever 42 in slot 46 moves the guide member radially outwardly to the position shown. With the boss 37 in its maximum eccentric position the pump capacity is maximum and the pump delivers oil through openings 52a through 52d to drive the motor vanes 50 carried by pulley 17. At this time oil is discharged from the motor vanes to the pump through openings 52e, 52f and 52g in boss 37. The motor and pulley 17 will be driven faster than the pump.

As the speed of shaft 10 and hub 12 increases, weights 33 pivot counterclockwise around pin 34 so that arm 38 moves pin 39, ring 40, and force transfer member 41 to the right. This causes counterclockwise rotation of bell crank lever 42 about pivot pin 43 such that the arm of the lever in slot 46 will move guide member 35 and boss 37 radially inwardly to reduce the eccentricity of boss 37 to reduce the capacity of the pump. The capacity of the motor is simultaneously increased so that the motor speed is decreased relative to the pump speed. The weights 33 and spring 44 are calibrated to keep the motor speed and pulley speed constant throughout a wide range of speed of rotation of shaft 10. At slow speeds of rotation the capacity of the pump is greater than that of the motor such that the motor overspeeds the pump. As the pump speed increases the weights 33 acting through bell crank lever 42 move the guide member 35 to decrease the pump capacity and simultanously increase the motor capacity so that the motor slows down relative to the speed of shaft 10, but rotates at its designed speed of rotation. The stroke of guide member 35 is limited by the axial range of motion of ring 40 in recess 36.

The drive mechanism provides for constant speed of rotation of accessory drive pulley 17 within the limits of operation of the device. By simultaneously varying the capacity of the pump and motor a finely graduated control of pulley speed may be obtained through a wide range of changes in the speed of rotation of shaft 10. The drive unit is filled with fluid which is sealed in the unit providing a self-contained unit adapted to fit on vehicles already in use as well as for factory installation. The unit is very compact and is simple in construction and operation. It will be understood that while only a single bell crank lever 42 has been described, there will be three or more such levers supplied to insure uniform support for ring 40. The concentric arrangement of the pump and motor with the pump disposed inside the motor makes possible the use of the single axially extending ring 37 which is radially movable and cooperates both with the pump and motor vanes to simultaneously vary the pump and motor capacities in response to radial motion of the ring. The structure provides a hydraulically sealed unit which is compact and economical to manufacture and provides a constant pulley speed throughout a wide range of variation of speed of input shaft 10.

I claim:

1. A constant speed drive mechanism comprising a drive member, a driven member, means for driving said driven member from said drive member including a variable capacity pump driven by said drive member and a variable capacity motor rotatable with said driven member and hydraulically connected to said pump, said pump and motor being disposed in concentric relationship with respect to each other, a movable member intermediate said pump and motor, for simultaneously varying the capacity of said pump and said motor, and speed responsive means disposed within the confines of said pump and driven by one element of said pump for controlling the position of said movable member.

2. A constant speed drive mechanism comprising a drive member adapted to be driven at various speeds of rotation, a driven member, means for driving said driven member including a variable capacity pump driven by said drive member and a variable capacity motor rotatable with said driven member, said motor being concentrically arranged with respect to said pump, said motor being hydraulically connected to said pump and driven by said pump, movable means comprising a ring disposed between said pump and motor for simultaneously varying the capacity of said pump and said motor, and means responsive to the speed of rotation of said drive member including a governor disposed within the confines of said pump and driven at the speed of rotation of said pump for controlling the position of said movable means.

3. A constant speed drive mechanism comprising a drive member adapted to be rotated at various speeds of rotation, a driven member, means for driving said driven member at a constant speed of rotation irrespective of variation of speed of rotation of said drive member including a variable capacity pump driven by said drive member and a variable capacity motor rotatable with said driven member, said pump and said motor being disposed in concentric relationship with respect to each other, said motor being driven hydraulically by said pump, a movable member extending between said pump and motor for controlling the capacity both of said pump and said motor, and speed responsive means including a movable member pivotally supported upon and driven by one element of said pump for controlling the position of said movable member to vary the speed of rotation of said motor with respect to the speed of rotation of said pump to maintain the speed of rotation of said motor constant irrespective of variation of the speed of rotation of said pump.

4. A constant speed drive mechanism comprising a drive member adapted to be driven at variable speeds of rotation, a driven member, means for driving said driven member including a variable capacity pump driven by said drive member and a variable capacity motor rotatable with said driven member, said pump and motor being disposed in concentric relationship with respect to each other, a movable member extending between said pump and motor providing a hydraulic circuit between said pump and motor, said movable member being movable to simultaneously vary the capacity of the pump and motor, and speed responsive means including a movable flyweight pivotally supported upon one element of said pump for rotation therewith for controlling the position of said movable member to vary the relative speed of rotation of said motor and said pump.

5. A constant speed drive mechanism comprising a drive member adapted to be rotated at various speeds of rotation, a driven member, means for driving said driven member including a variable capacity vane type pump and a variable capacity vane type motor, said pump being rotatable with said drive member, said motor being driven by said pump and rotatable with said driven member, a movable member separating the vanes of said pump from the vanes of said motor for controlling the capacity of both said pump and motor, and speed responsive means including a plurality of flyweights disposed within said pump and pivotally supported upon one element of said pump for rotation therewith for controlling the position of said movable member, said speed responsive means being operatively connected to and effective to position said movable member to maintain a constant speed of rotation of said motor irrespective of variation of the speed of rotation of said pump.

6. A constant speed drive mechanism comprising a drive member adapted to be rotated at varying speeds of rotation, a driven member, means for driving said driven member including a variable capacity vane type pump rotatable with said drive member and a variable capacity vane type motor rotatable with said driven member, said pump and and said motor being disposed in concentric relationship with respect to each other, an annular radially movable member extending transversely of said pump and motor vanes, said pump vanes contacting one surface of said annular member and said motor vanes contacting a second surface of said annular member, and speed responsive means including a plurality of flyweights driven by one element of said pump and operatively connected to said annular member for controlling the position of said annular member, said speed responsive means being effective upon an increase in speed of rotation of said drive member to move said annular member to decrease the capacity of said pump and simultaneously increase the capacity of said motor.

7. A constant speed drive mechanism comprising a drive shaft adapted to be rotated at varying speeds of rotation, a driven housing rotatable at different speeds with respect to the speed of rotation of said drive shaft, a hub member in said housing driven by said drive shaft, a pump having vanes carried by said hub, a motor driven by said pump having vanes carried by said driven housing, a radially movable annular ring extending transverse of said housing and contacting said pump vanes and said motor vanes, weight members pivotally supported upon said hub, and means for transmitting force from said weight members to said annular ring to move said annular ring radially inwardly upon an increase in speed of rotation of said drive shaft to decrease the capacity of said pump and simultaneously increase the capacity of said motor.

8. A constant speed drive mechanism comprising a drive shaft adapted to be rotated at varying speeds of rotation, a driven housing rotatable at different speeds with respect to the speed of rotation of said drive shaft, a radially movable annular ring extending transverse to said housing and dividing said housing into a pump chamber and a motor chamber, a variable capacity pump disposed in said pump chamber, said pump including a hub member driven by said drive shaft and supporting a plurality of pump vanes in contact with one surface of said annular ring, a variable capacity motor in said motor chamber, said motor including a plurality of motor vanes supported upon said driven housing and contacting a second surface of said annular ring, a series of weights pivotally supported upon said hub, and means for transmitting force from said weights to said annular ring effective to move said annular ring radially inwardly to decrease the capacity of said pump and simultaneously increase the capacity of said motor upon an increase in speed of rotation of said drive shaft.

9. A constant speed drive mechanism comprising a power input drive member adapted to be rotated at variable speeds of rotation, a power delivery housing rotatable at variable speeds of rotation with respect to the speed of rotation of said power input member, an annular ring extending axially transverse of said housing and dividing said housing into a pump chamber and a motor chamber, a radially movable support member in said housing supporting said ring for radial movement, a variable capacity pump disposed in said pump chamber, said pump including a hub driven by said power input member and supporting a plurality of pump vanes in contact with one surface of said ring, a variable capacity motor in said motor chamber including a plurality of motor vanes rotatable with said housing and contacting a second surface of said ring, a weight pivotally supported on said hub, a bell crank lever operative upon said radially movable support member, and means operatively connecting said bell crank lever to said weight, said weight and bell crank lever cooperating to move said radially movable support and said annular ring radially inwardly to maintain a constant speed of rotation of said housing upon an increase in speed of rotation of said power input member.

10. A constant speed drive mechanism comprising a power input drive member adapted to be rotated at variable speeds of rotation, a power delivery housing rotatable at variable speeds of rotation with respect to the speed of rotation of said power input member, an annular ring extending axially transverse of said housing and dividing said housing into a pump chamber and a motor chamber, a radially movable support member in said housing supporting said ring for radial movement, a variable capacity pump disposed in said pump chamber, said pump including a hub driven by said power input member and supporting a plurality of pump vanes in contact with one surface of said ring, a variable capacity motor in said motor chamber including a plurality of motor vanes rotatable with said housing and contacting a second surface of said ring, a weight pivotally supported on said hub, a bell crank lever operative upon said radially movable support member, and means operatively connecting said bell crank lever to said weight, said weight and bell crank lever cooperating to move said radially movable support and said annular ring radially inwardly to maintain a constant speed of rotation of said housing upon an increase in speed of rotation of said power input member, and spring means opposing the action of said weight and operative upon said bell crank lever to move said radially movable support and said annular ring radially outwardly to maintain a constant speed of rotation of said housing upon a decrease in speed of rotation of said power input member.

References Cited in the file of this patent

UNITED STATES PATENTS

| | | |
|---|---|---|
| 466,662 | Duncan | Jan. 5, 1892 |
| 2,500,580 | Segsworth | Mar. 14, 1950 |
| 2,738,649 | Long | Mar. 20, 1956 |
| 2,991,619 | Powell | July 11, 1961 |

FOREIGN PATENTS

| | | |
|---|---|---|
| 572,514 | Great Britain | Oct. 11, 1945 |